United States Patent [19]
Cobb

[11] 3,843,138
[45] Oct. 22, 1974

[54] SHEET METAL COMPRESSION RING

[75] Inventor: David A. Cobb, Hazelcrest, Ill.

[73] Assignee: International Harvester Company, Chicago, Ill.

[22] Filed: Nov. 24, 1972

[21] Appl. No.: 309,035

[52] U.S. Cl.............. 277/22, 123/193 P, 277/216, 277/236
[51] Int. Cl............................................. F16j 9/22
[58] Field of Search ............ 277/226, 22, 216, 217, 277/236, 237, 171; 123/193 P

[56] References Cited
UNITED STATES PATENTS

| | | | |
|---|---|---|---|
| 1,998,915 | 4/1935 | Young | 277/226 |
| 2,647,770 | 8/1953 | Tollefsbol | 277/236 |
| 3,007,600 | 11/1961 | Horner | 277/236 |
| 3,352,006 | 11/1967 | Tatsuo Satch et al. | 277/236 |
| 3,761,102 | 9/1973 | Nickolson | 277/236 |
| 3,766,900 | 10/1973 | Aiti | 123/193 P |
| 3,797,466 | 3/1974 | Nambu | 123/193 P |

*Primary Examiner*—Louis R. Prince
*Assistant Examiner*—Robert I. Smith
*Attorney, Agent, or Firm*—John W. Gaines; Floyd B. Harman

[57] ABSTRACT

A sheet metal split piston ring of tubular construction, characterized by closed cross section and plugged ends which seal the hollow interior of the ring air tight. The steel sheet metal material from which the ring is fabricated imparts to it the advantages of a solid iron ring, plus lightness and an insert-free placement near the top of the piston which are not obtainable by the iron ring.

13 Claims, 5 Drawing Figures

PATENTED OCT 22 1974 3,843,138

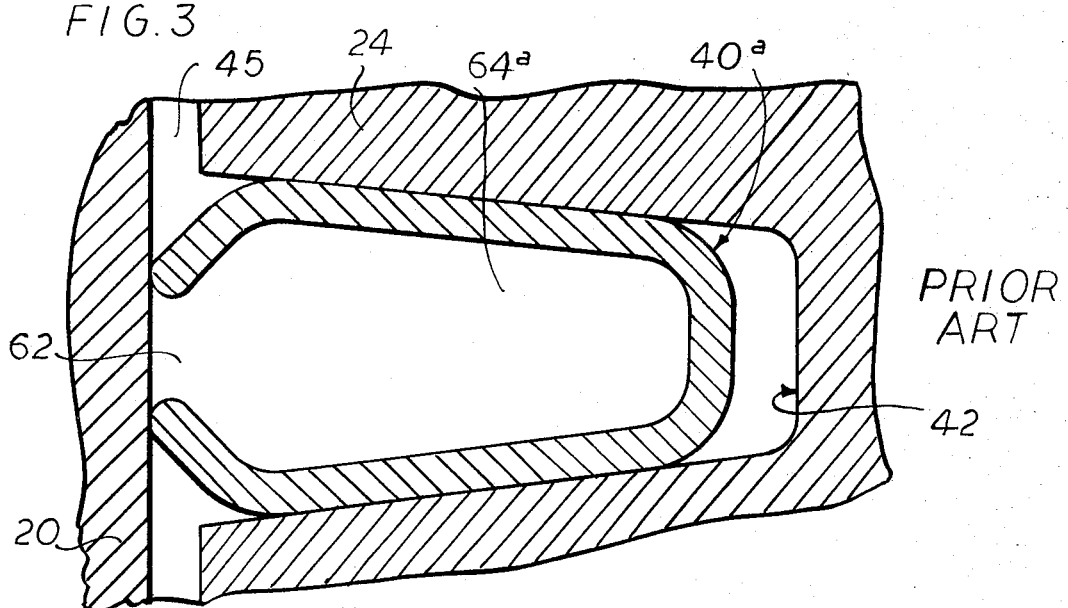
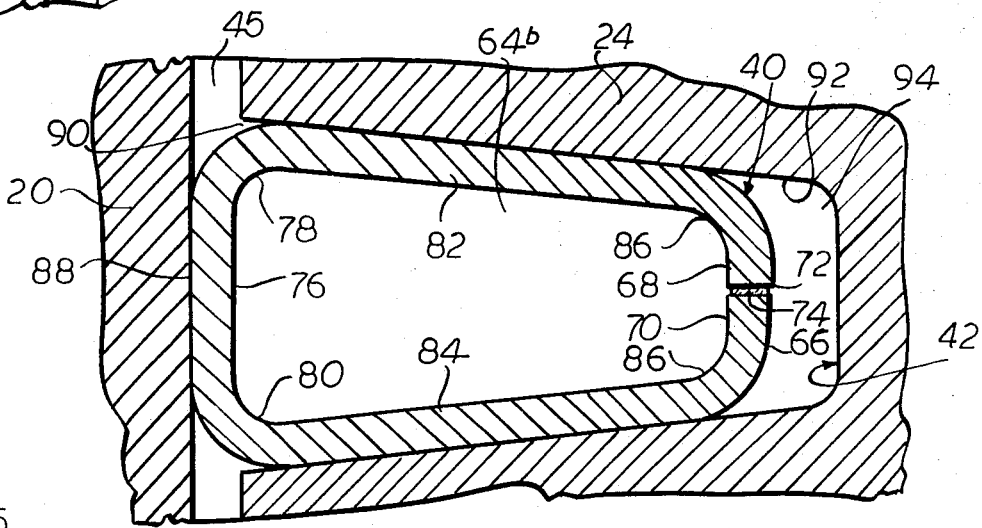
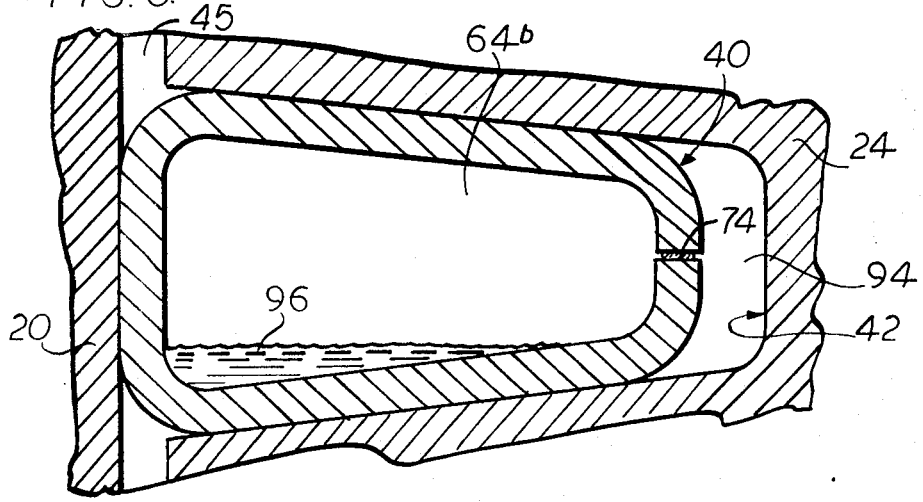

SHEET METAL COMPRESSION RING

This application relates to a split piston ring for IC engines, particularly a ring of tubular construction characterized by closed cross section and plugged ends which seal the hollow interior of the ring air tight.

Pistons adapted for iron sealing rings, particularly diesel aluminum pistons, introduce a problem because of the top ring placement. The top ring very often is set in a hardened grooved insert provided in the piston to prevent the ring from hammering itself out, and there is an attendant manufacturing disadvantage because the insert dictates making the piston with a composite metal construction. And, with or without the complication of providing the insert, the ring is spaced a substantial distance on the head down from the piston crown, to prevent the ring, or ring and insert if provided, from being torn off the piston or torn loose from the head thereof. The attendant disadvantage is that the long annular volume between the head and confronting cylinder wall adds an unnecessarily large "dead" volume to the combustion chamber at the end of the cylinder volume in which the combustion is excessively quenched and inefficient if fuel is present, and in which generally no effective amount of fuel is mixed in and in which no combustion occurs at all.

Pistons adapted in practice to carry lightweight combustion rings have introduced a problem of their own. According to the prior practice, the ring is fabricated as a lightweight shell open on one or more of the sides as viewed in cross section, and also open at the ends if fabricated as a split ring. A gap or gaps are necessarily present in the shell wall at the open side or sides, and one attendant disadvantage is the ring does not have lateral stability from vibration of the gapped wall portions and does not have a consistent deep beam, radial spring rigidity comparable to cast iron rings in providing the requisite mechanical or spring seal loading strength. Also the open interior of the shell unwantedly adds to dead volume of the combustion chamber, by the amount of all groove volume unoccupied by the sheet metal.

The presently high placed, lightweight ring has the advantage on a piston of materially reducing or substantially eliminating the foregoing problems, and affording in the engine a more pollution free combustion process as will now be explained in detail. Features, objects, and advantages will either be particularly pointed out or become apparent when, for a better understanding of my invention, reference is made to the following description, taken in conjunction with the accompanying drawings which show a preferred embodiment thereof and in which:

FIG. 3 is an enlarged view of a ring detail shown similarly to FIG. 1, the ring cross section being typical of the prior art;

FIG. 4 is an enlarged view of the compression ring detail of FIG. 1, emphasizing specifically the ring cross section; and FIG. 5 is similar to FIG. 4, but shows a modification of the ring invention.

Figure 1:
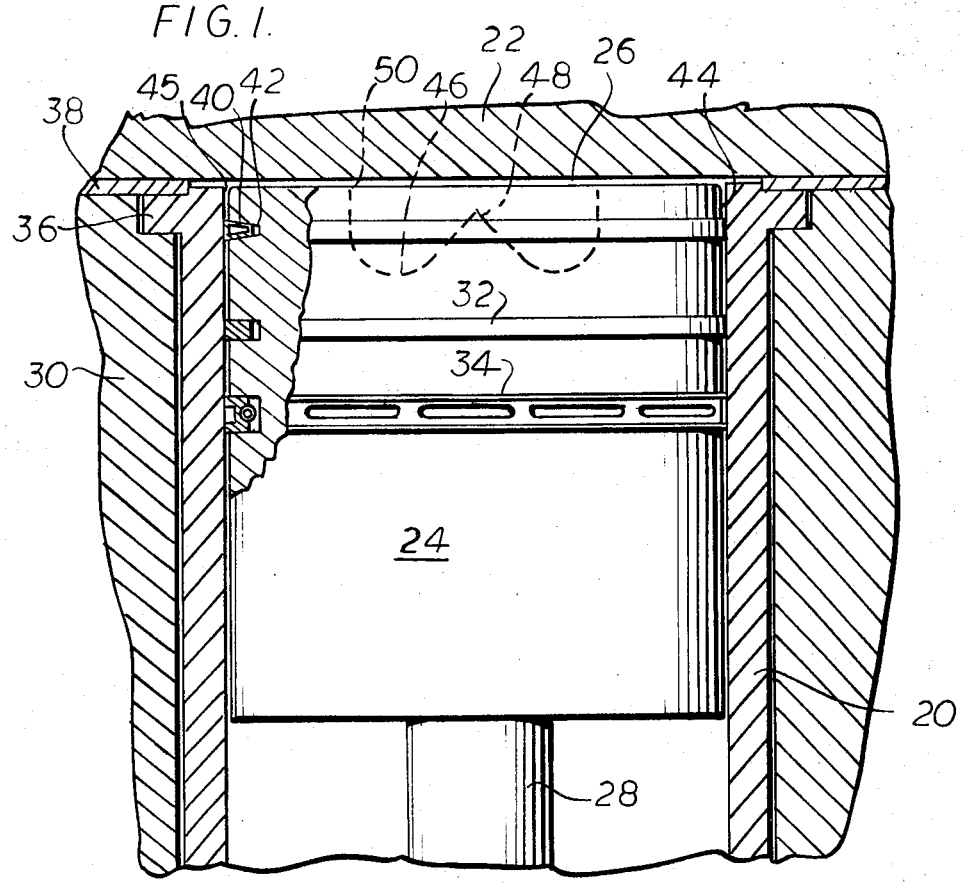
FIG. 1 is a longitudinal side elevational view through one cylinder of an engine embodying the present split piston ring invention.
Figure 2:
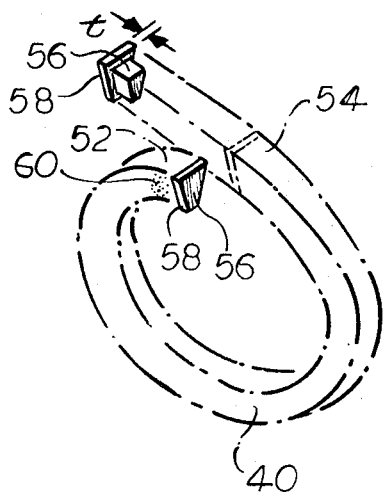
FIG. 2 is a phantom isometric view of the split piston ring showing a detail of plugging the ends of the ring at the split or gap therein.

More particularly in FIG. 1 of the drawings, the exemplary cylinder 20 of an engine, as shown, is specifically the No. 2 cylinder (frontmost cylinder, right bank) of a 90°, V8 diesel engine. A head 22 at the outer end of the cylinder and a piston 24 slidably mounted in the cylinder mutually define with the cylinder a combustion chamber 26. A connecting rod 28 connects a piston wrist pin, not shown, in conventional way to an engine crankshaft, not shown. A cylinder or sleeve 20 lines one bore of a series of eight bores provided in the block 30 of the engine.

The piston 24 carries a so-called second compression ring 32 and an oil control ring 34, all located within the customarily provided ring belt on the piston. The radial liner flange 36 on the cylinder or the liner sleeve 20 rests on the block 30 to support the cylinder at its outer end. The cylinder head 22 clamps a head gasket 38 against the liner flange 36 and the deck of the block 30.

In the immediate vicinity of, and particularly above, a top keystone shaped compression seal ring 40 which is provided and a top keystone shaped groove 42 which is formed in the piston and which receives the top ring, the portion of the piston can be materially set back or not and, in either case, forms a top land 44. An annular gas orifice 45 thus results between the headland or top land 44 and the wall of the cylinder 20 and between the top ring 40 and the crown end or upper end of the top land 44. The thickness radialwise in the orifice 45 will depend upon the amount of setback of the top land 44. But the axial length of the orifice 45 is preferably drastically limited by reason of the exceptionally highly raised position of the top groove 42 on the piston. Although the orifice 45 affords gas loading of the top ring 40 for good sealing, the orifice nonetheless adds waste space about the upper end of the piston and represents "dead" clearance volume adding to the size of the combustion chamber but not contributing to its function.

The combustion chamber is otherwise conventional, and the piston 24 incorporates a so-called Mexican hat design in the example illustrated. In other words, a deep combustion dish 46 is formed slightly eccentrically or else concentrically to the head, having a central upstanding cone tip 48 and being surrounded by an annular crown 50. The combustion dish 46, along with shallow intake and exhaust valve cutouts which intersect the dish and which are not shown, form depressions in the head which are subjected to maximum gas pressure during burning of injected fuel, not shown, in the combustion chamber 26. Obviously, the combustion dish 46 is the heart of the combustion chamber 26 and is so readily accessible and open that, ideally, all piston end clearance volume should desirably be relegated to the dish for maximum combustion efficiency.

Also ideally, the groove 42 is formed directly in the piston irrespective of whether the material is iron or something softer, such as aluminum or an aluminum alloy as illustrated. Yet my invention prevents rings from being torn off pistons or torn loose from the head thereof.

HOLLOWNESS — FIG. 2

To prevent ring inertia from hammering or tearing off the ring 40 from the piston, the top ring 40 is hollow for lightness. Specifically, it is a split ring 40 comprising a closed shell of sheet metal bent into a tubular generally uniform cross section from end 52 to end 54. The adjacent ends 52 and 54 define a gap G, not shown, when they are aligned. But to keep open the hollow ends, each end 52 and 54 receives a plug 56 geometrically complementary thereto and carrying a transverse plug end flange 58 which is externally identical, as viewed in cross section, with the cross section of the hollow ring 40.

In installing the plugs 56, the ring ends 52 and 54 are laterally separated out of alignment whereupon the plugs are inserted and permanently affixed by spot welding 60. In this way the ends are sealed to keep the hollow interior closed off. The thickness $t$ of each end flange 58 is so determined in advance that the ring gap will be proper after the plugs are installed and the ends 52 and 54 thereafter are allowed to spring back into alignment in the plane of the ring.

PRIOR ART — FIG. 3

The shell of a prior art ring such as ring 40a has, depending upon manufacturing practice, varied in thickness from thin material to thick material and has been open at one or more sides so as to include an opening such as at 62. So not only does the space in the bottom of the groove 42, but also the space 64a in the hollow interior of the ring 40a contributes to the dead volume of the combustion chamber. Both spaces are put under explosion gas pressure by, and communicate with, the gas orifice 45.

CLOSED CROSS SECTION — FIG. 4

The curved backside 66 of the ring 40 according to my invention has adjacent walls 68 and 70 which, as viewed in cross section, define a nearly closed gap 72. A continuous seam weld 74, deposited across the gap by electron beam welding, for example, unifies and rigidifies the adjacent walls 68 and 70 so as to seal off the hollow interior 64b of the cross section.

MANUFACTURE

From flat stock of steel sheet metal, a thin strip is drawn through forming guides which, in stages, form the outer bends 78 and 80 defining the referred to face wall 76 of the tube. Then, in stages of bending, an upper side wall 82 and a lower side wall 84 are defined by inner bends 86 which are made and which turn the backside adjacent walls 68 and 70 into plane with one another in closely spaced apart adjacency. The centroid axis of the section at the time of drawing the tube is straight, and the resulting straight tube is then cut into lengths equalling the developed length of the rings desired.

Each tube is rolled to the proper ring diameter, whereupon the adjacent walls 68 and 70 are seam-welded as described. Then the end plugs 56 are affixed as described.

At some point, a chrome facing or other facing for wear can be readily applied as a face surface 88 by plating deposition, by vapor deposition, or other depositions. Finally, the outside diameter at least along the facing 88 is finish ground and lapped to size with the centroid axis obviously curving at the time consistent with the curvature of walls of the backside 66 and the face side 76.

OPERATION — FIG. 4

Explosion pressure communicated by means of the gas orifice 45 forces the gas inwardly in a path leading through an imperceptible but finite side clearance 90 along an upper groove side 92 and thence leading into the bottom 94 of the ring groove 42. The natural amount of mechanical spring force of the spring radially of its curved centroid axis, not shown, augmented by the much larger loading force against the curved backside 66, developed by the combustion gas in the groove bottom 94, forces the ring 40 into good sealing relationship with its face wall 80 against the confronting wall of the surrounding cylinder 20.

MODIFICATION — FIG. 5

The ring 40 is the same as previously, except for the modification that the sealed hollow interior 64b thereof contains a body 96 of coolant material partially filling same. A metal with a low melting point, e.g., sodium, will be effective as the coolant body, transferring heat as it alternates between contacting the upper side wall 82 and the lower side wall 84 as the piston causes the ring to reciprocate on opposite strokes.

Because of its high ring placement making it superior in lowering pollution attributable to exhaust emissions, and its freedom from needing a hard metal insert to be cast into the piston ring belt to receive the ring, and because of its lightness making it superior for high speed engine operation, and its strength resulting from a steel cross section with the metal well spaced from the centroid axis therein, and the use simply of fabricated sheet metal therein, the resulting stronger, lighter, rigider-cross-sectioned, and cheaper ring according to my invention will contribute to an appreciably better engine. That is to say, the hollow ring when in an engine according to my invention will not be subject to the brittleness and cracking to which a comparable cast iron top ring is susceptible, and the hollow ring can therefore withstand higher thermal loads and cylinder gas loads without failing.

It will therefore be appreciated that I have provided the novel combination, with an engine cylinder: of a piston reciprocable therein having a top ring groove closely adjacent the head of the piston; a headland between the groove and the piston crown, set back so as to confront the cylinder with a short generally annular, gas loading orifice defined therebetween; a split ring of tubiform construction in the groove sealing the piston in the cylinder, the ring having two adjacent ends, a top side, and a back side with adjacent walls defining a nearly closed gap in the tubiform construction; the ring and groove mutually defining a first side clearance between the top side of the ring and the upper side of the groove, and mutually defining a backside clearance between the gapped backside of the ring and the bottom of the groove; and closure means sealing off the hollow interior of the tube, by sealing the ends and backside gap, so that the ring limits dead cylinder space about the piston head to the total volume of the defined short orifice, first side clearance and backside clearance.

As herein disclosed, the hollow ring according to my invention is shown to have a four-sided prism form which is trapezoidal or keystone-like as viewed in cross section. Naturally, the ring groove is shown to have a complementary keystone shape. It is evident that for use with grooves of rectangular shape a complementary rectangular hollow ring will be employed according to my invention and, for use with a semi-keystone groove in which one groove side has rectangular configuration whereas the other side of the groove has keystone configuration, a complementary hollow ring will be employed. So also, the drawings disclose compression rings in which the top ring or combustion ring has the hollow tube construction; self-evidently, the hollow construction is equally applicable to one or more of the other compression rings and to any or all of such rings.

Variations within the spirit and scope of the invention described are equally comprehended by the foregoing description:

What is claimed is:

1. Split piston ring of hollow construction for internal combustion piston engines, comprising a closed shell of sheet metal bent into a tubular generally uniform cross section;
   said shell presenting respective thin side walls at the face, at the back, and at the top and bottom sides, and having a nearly closed gap in the bent sheet metal located in one of said sides; and
   a weld effective in said gap to close the cross section, said weld extending for the circumferential length of the ring, sealing across the gap and sealing off the closed shell air tight.

2. The split ring of claim 1 characterized by two adjacent ends; and
   end closure means to complete the sealing by closing off the ends of the ring.

3. The invention of claim 2, the closure means characterized by fixed end plugs.

4. The invention of claim 2 characterized by an internally cooled ring with the hollow interior containing coolant.

5. The invention of claim 4, the coolant characterized by a mass which is at least in part sodium.

6. The invention of claim 1 characterized by:
   the face and back of the shell being curved sides;
   the gap and weld being located in one of said curved sides.

7. The invention of claim 6 further characterized by:
   a wear plating on the side wall at the face side.

8. The invention of claim 6, said one side characterized by the back side of the shell.

9. Multi-part gapped piston ring of fabricated construction comprising:
   a circumferential tube nearly closing on itself at the ring gap and carrying thereat plugs individual to the tube ends; and
   end flanges on the plugs exposing the same geometric cross section as the tube.

10. In combination with an engine cylinder:
    a piston reciprocable therein having a top ring groove closely adjacent the head of the piston;
    a headland between the groove and piston crown, set back so as to confront the cylinder with a short generally annular, gas loading orifice defined therebetween;
    a split ring of tube construction in the groove sealing the piston in the cylinder, said ring having two adjacent ends, a top side, and a back side with adjacent walls defining a nearly closed gap in the tube construction, said ring and groove mutually defining a first side clearance between the top side of the ring and the upper side of the groove, and mutually defining a backside clearance between the gapped backside of the ring and bottom of the groove; and
    closure means sealing off the hollow interior of the tube, by sealing the ends and backside gap, so that the ring limits dead cylinder space about the piston head to the sum of the volumes of the defined short orifice, first side clearance, and backside clearance.

11. The invention of claim 10, said closure means comprising a weld effective in said gapped backside to close the cross section, said weld extending for the circumferential length of the ring, sealing across the gap and sealing off the closed tube air tight.

12. The invention of claim 10, said ring further having a side wall defining a face side, and a wear plating on the side wall at the face side.

13. The invention of claim 10, said closure means comprising plugs individual to the two adjacent ends of the ring, and end flanges on the plugs externally exposing the same geometric cross section as the tubular cross section of the split ring construction.

* * * * *